United States Patent
Hutter et al.

(10) Patent No.: US 6,189,748 B1
(45) Date of Patent: Feb. 20, 2001

(54) SWING-AWAY SPARE TIRE CARRIER

(75) Inventors: Robert B Hutter, South Lyon; Eric P Thorne, Livonia; Christopher G Burchart, New Hudson; Brian C Lazarus, Novi, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/498,800

(22) Filed: Feb. 2, 2000

(51) Int. Cl.[7] .................................................. B62D 43/00
(52) U.S. Cl. .................................... 224/42.21; 224/42.28; 224/502; 224/518; 296/37.2; 296/51; 414/465
(58) Field of Search .......................... 224/42.12, 42.21, 224/42.26, 42.27, 42.28, 42.29, 42.3, 502, 503, 504, 510, 518; 296/37.2, 51; 414/462, 463, 464, 465, 466

(56) References Cited

U.S. PATENT DOCUMENTS

| 3,753,520 | * | 8/1973 | Bodde | ......................... 224/42.21 X |
| 3,845,891 | * | 11/1974 | Becher | ............................... 224/42.21 |
| 4,679,717 | * | 7/1987 | Hansen | ......................... 224/42.21 X |
| 5,186,371 | * | 2/1993 | Jozefczak et al. | ................. 224/42.21 |
| 5,538,168 | * | 7/1996 | Burger et al. | ..................... 224/42.21 |
| 5,967,389 | * | 10/1999 | Hutter et al. | ....................... 224/42.21 |

* cited by examiner

Primary Examiner—Stephen K. Cronin
(74) Attorney, Agent, or Firm—Roland A. Fuller, III

(57) ABSTRACT

A swing-away spare tire carrier for a motor vehicle includes a cross tube extending transversely for attachment to underside vehicle structure of the motor vehicle and an arm support bracket secured to the cross tube. The swing-away spare tire carrier also includes a carrier arm having a first arm portion pivotally attached to the arm support bracket and a second arm portion pivotally attached to the first arm portion for pivotal movement between a first position adjacent a vehicle body of the motor vehicle and a second position extending substantially laterally from the vehicle body when the second arm portion is moved toward the first arm portion.

20 Claims, 3 Drawing Sheets

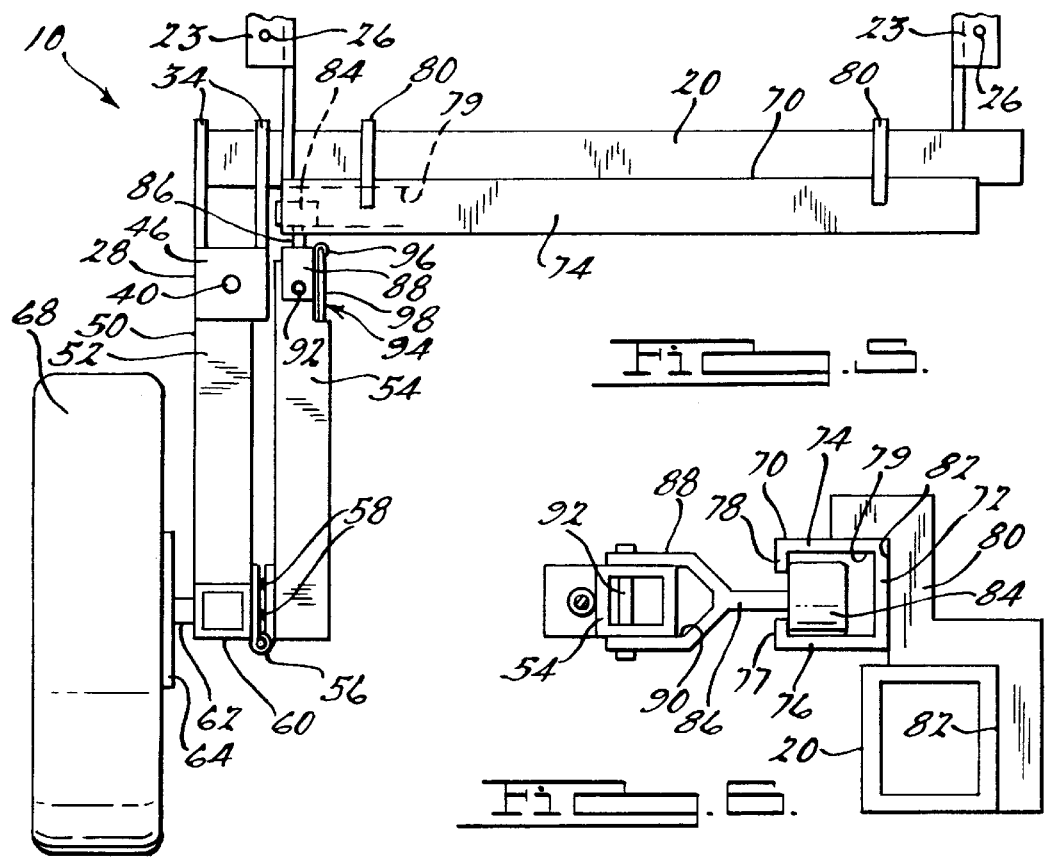
Fig. 5.
Fig. 6.
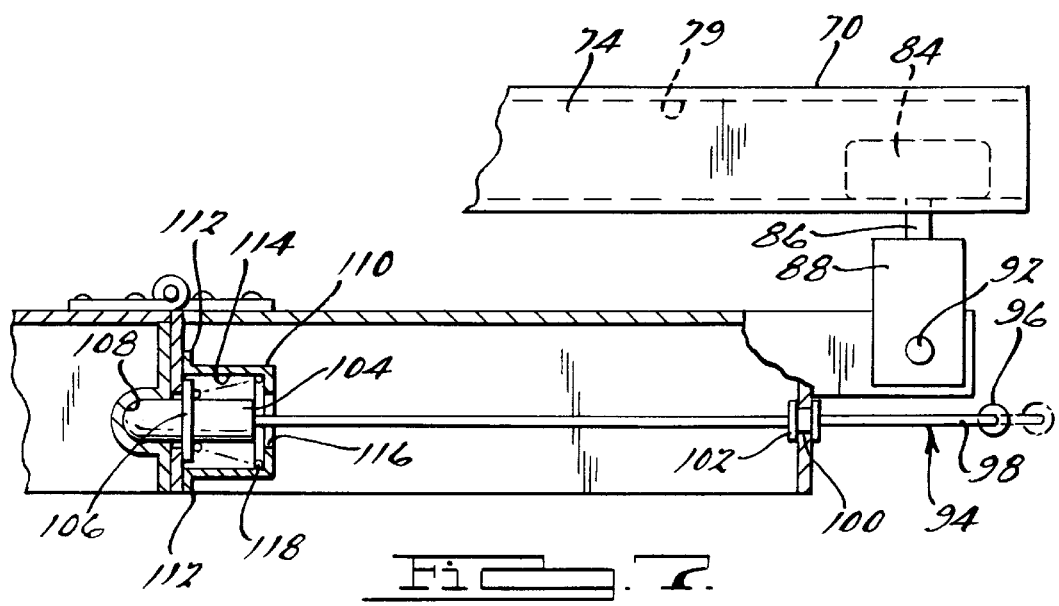
Fig. 7.

SWING-AWAY SPARE TIRE CARRIER

BACKGROUND OF THE INVENTION

1. Field of the Invention

The present invention relates generally to spare tire carriers for vehicles and, more particularly, to a swing-away spare tire carrier for a motor vehicle.

2. Description of the Related Art

Motor vehicles typically include a spare tire in the event of a flat or blowout of one of four tires of the vehicle. The spare tire may be carried interior or exterior to the motor vehicle. For exterior motor vehicle applications, the spare tire is mounted on a spare tire carrier. The spare tire carrier may be stationary or movable. For movable applications, the spare tire carrier has a carrier arm pivotally mounted to a bracket, which is fixedly secured to a rear bumper or hatch door of the motor vehicle by fasteners. The spare tire is mounted by fasteners to the carrier arm, which allows the spare tire to "swing-away" from the motor vehicle.

One disadvantage of the above spare tire carrier is that it places a load on the rear bumper or hatch door of the motor vehicle, which is undesired. Another disadvantage of the above spare tire carrier is that it has a relatively large number of parts.

SUMMARY OF THE INVENTION

It is, therefore, one object of the present invention to provide a new and improved swing-away spare tire carrier for a motor vehicle.

It is another object of the present invention to provide a swing-away spare tire carrier that is self-contained and not mounted to a rear bumper or hatch door of a motor vehicle.

It is yet another object of the present invention to provide a swing-away spare tire carrier for a motor vehicle, which has fewer parts.

To achieve the foregoing objects, the present invention is a swing-away spare tire carrier for a motor vehicle. The swing-away spare tire carrier includes a cross tube extending transversely for attachment to underside vehicle structure of a motor vehicle, preferably of a rear portion of the motor vehicle and, preferably beneath a rear bumper of the motor vehicle, and an arm support bracket secured to the cross tube. The swing-away spare tire carrier also includes a carrier arm having a first arm portion pivotally attached to the arm support bracket and a second arm portion pivotally attached to the first arm portion for pivotal movement between a first position adjacent a vehicle body of the motor vehicle and a second position extending substantially laterally from the vehicle body when the second arm portion is moved toward the first arm portion.

One advantage of the present invention is that a new and improved swing-away spare tire carrier is provided for a motor vehicle. Another advantage of the present invention is that the swing-away spare tire carrier is attached to vehicle structure similar to a trailer towing hitch. Yet another advantage of the present invention is that the swing-away spare tire carrier is relatively strong and less in parts. Still another advantage of the present invention is that the swing-away spare tire carrier is of a bi-fold type. A further advantage of the present invention is that the swing-away spare tire carrier is self-contained, no mounting to the rear bumper or hatch door of the motor vehicle.

Other objects, features and advantages of the present invention will be readily appreciated, as the same becomes better understood, after reading the subsequent description when considered in connection with the accompanying drawings.

BRIEF DESCRIPTION OF THE DRAWINGS

FIG. 5 is a view similar to FIG. 3 illustrating the swing-away spare tire carrier in a third position extending substantially laterally away from the vehicle body.

FIG. 6 is a sectional view taken along line 6—6 of FIG. 3.

FIG. 7 is a fragmentary plan view of a portion of the swing-away spare tire carrier of FIGS. 1 and 2.

DESCRIPTION OF THE PREFERRED EMBODIMENT(S)

Figure 1:
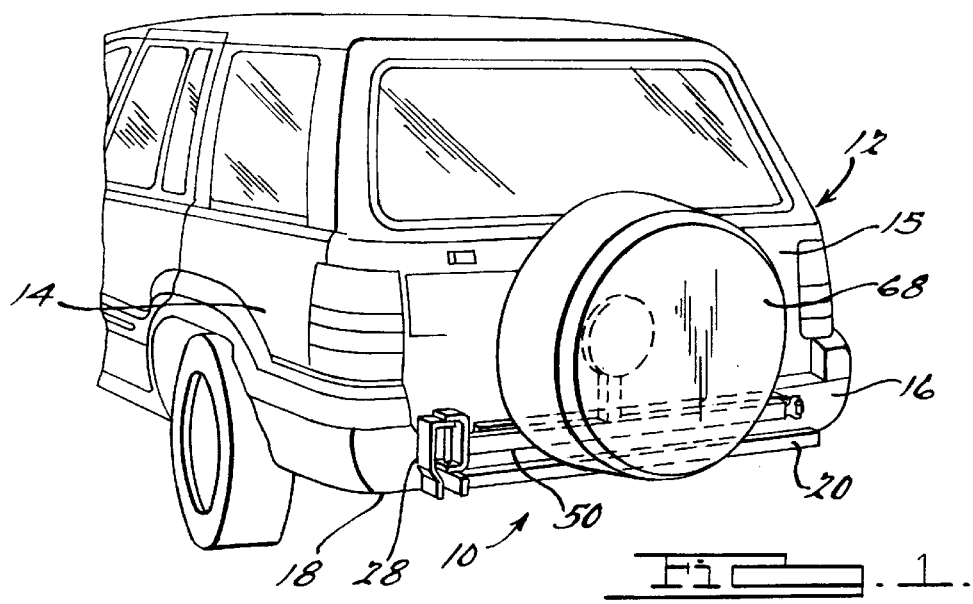
FIG. 1 is a perspective view of a swing-away spare tire carrier, according to the present invention, illustrated in operational relationship with a motor vehicle.
Figure 2:
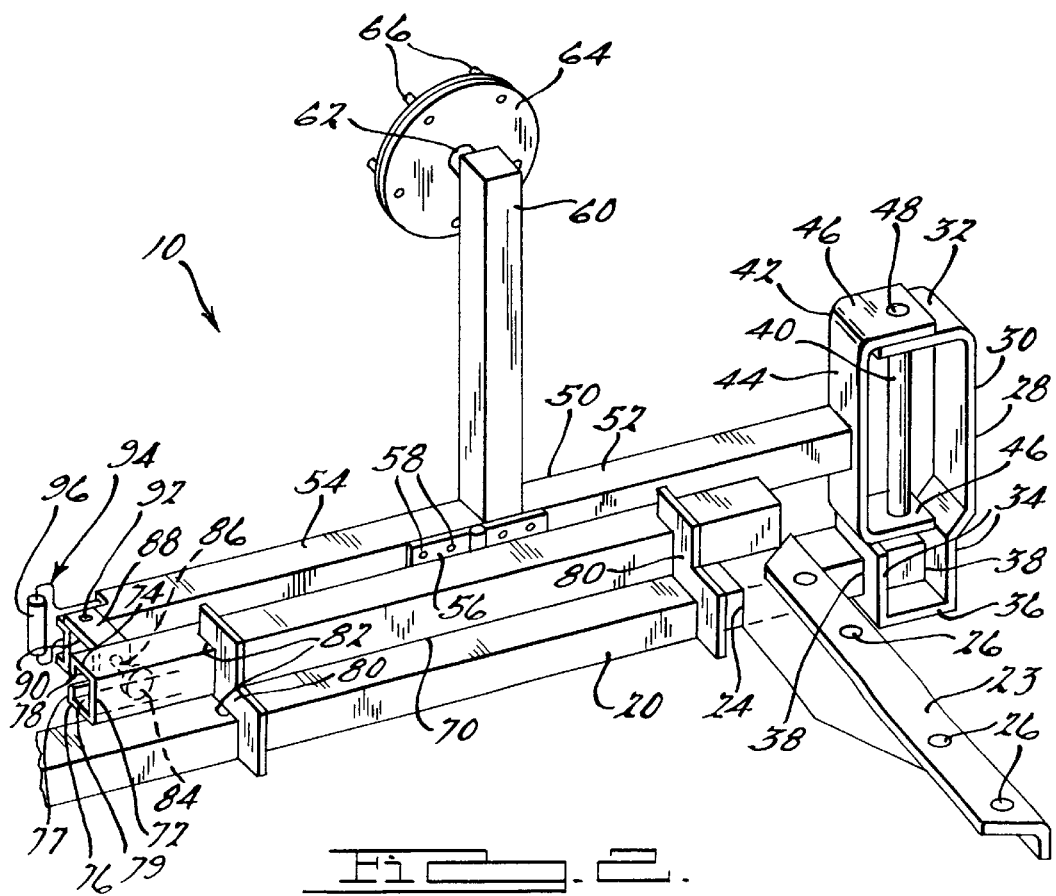
FIG. 2 is a perspective view of the swing-away spare tire carrier and motor vehicle of FIG. 1 with the spare tire removed.
Figure 3:
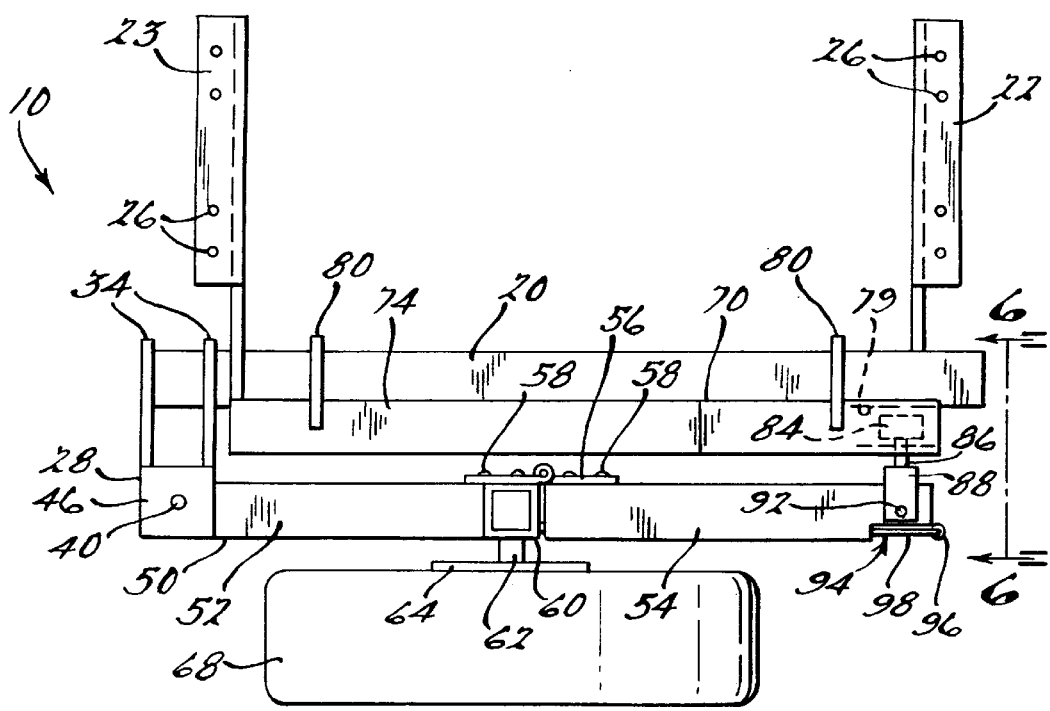
FIG. 3 is a plan view of the swing-away spare tire carrier of FIGS. 1 and 2 illustrated in a first position adjacent a vehicle body of the motor vehicle.

Referring to FIGS. 1 through 3, a swing-away spare tire carrier 10, according to the present invention, is illustrated in operational relationship with a motor vehicle, generally indicated at 12. The motor vehicle 12 includes a vehicle body 14 having a rear door 15 and a rear bumper 16 mounted thereon as is known in the art. The swing-away spare tire carrier 10 is mounted to underside vehicle structure, such as an underbody or floor pan 18 of the vehicle body 14, preferably of a rear portion of the motor vehicle 12, and preferably below the rear bumper 16. It should be appreciated that the swing-away spare tire carrier 10 is mounted to similar vehicle structure as a conventional trailer towing hitch (not shown) for the motor vehicle 12. The swing-away spare tire carrier 10 includes a cross member or tube 20 extending transversely and a right-hand flange bracket 22 at one end of the cross tube 20 and a left hand flange bracket 23 spaced transversely from the right-hand flange bracket 22 along the cross tube 20. The cross tube 20 is a generally rectangular tube. The flange brackets 22 and 23 have a generally inverted "L" shape and extend longitudinally with an aperture 24 extending transversely therethrough to receive the cross tube 20. The flange brackets 22 and 23 are secured to the cross tube 20 by suitable means such as welding. Each flange bracket 22 and 23 is mounted to the underbody 18 of the vehicle body 14 by suitable means such as fasteners (not shown). The fasteners extend through apertures 26 in the flange bracket 22 and 23 and apertures (not shown) in the underbody 18 and may threadably engage threaded apertures (not shown) in a fastening strip (not shown) disposed within the vehicle body 14. It should be appreciated that the cross tube 20 and flange brackets 22 and 23 are similar to those of the trailer towing hitch and secured to the motor vehicle 12 in a similar manner. It should also be appreciated that a skid plate (not shown) may extend transversely between the flange bracket 22 and 23 and be secured to the vehicle body 14 by the fasteners.

The cross tube 20 may include a hitch receiver (not shown) and receiver support plates (not shown) attaching a top and bottom of the hitch receiver to the cross tube 20 by suitable means such a welding. The hitch receiver is a generally rectangular tube for receiving a hitch insert (not shown) having a carrier or hitch ball (not shown). The cross tube 20 may also include a hitch bracket (not shown) secured to the cross tube 20 by suitable means such as welding. It should be appreciated that if the cross tube 20 includes the hitch receiver, receiver support plates and hitch bracket that it forms a conventional trailer towing hitch for the motor vehicle 12.

Referring to FIGS. 1 through 7, the swing-away spare tire carrier 10 includes an arm support bracket 28 at the other end of cross tube 20. The arm support bracket 28 has a plate portion 30 extending generally vertically and a flange portion 32 extending laterally to form a general "L" shape. The arm support bracket 28 has a pair of flange arm portions 34 extending longitudinally and spaced transversely and a bottom portion 36 extending between the flange arm portions 34 to form a generally U-shaped cross section. One of the flange arm portions 34 extends from the plate portion 30. Preferably, the arm support bracket 28 is a monolithic structure being integral, unitary and one-piece. Each of the flange arm portions 34 have an aperture 38 extending transversely therethrough to receive the cross tube 20 and is secured to the cross tube 20 by suitable means such as welding. The arm support bracket 28 includes a post 40 extending upwardly from the cross tube 20 and through an aperture (not shown) in the flange portion 32 and an arm bracket 42 disposed about the post 40. The post 40 is preferably a solid rod having a generally circular cross-sectional shape. The arm bracket 42 is generally C-shaped and has an arm portion 44 extending upwardly and a flange portion 46 extending generally perpendicular to the arm portion 44 at a top and bottom thereof. The flange portions 46 each have an aperture 48 extending therethrough to receive the post 40. It should be appreciated that the arm bracket 42 rotates relative to the post 40.

The swing-away spare tire carrier 10 also includes a carrier arm 50 extending laterally and connected by suitable means such as welding to the arm portion 44 of the arm bracket 42. The carrier arm 50 is a tubular member having a generally rectangular cross-section. The carrier arm 50 is divided into a pair of first and second arm portions 52 and 54, respectively, that are pivotally connected together at adjacent ends by suitable means such as a hinge 56. The hinge 56 extends laterally and is connected to the first and second arm portions 52 and 54 by suitable means such as fasteners 58. The carrier arm 50 includes a support arm 60 extending upwardly and generally perpendicular to the first arm portion 52. The carrier arm 50 includes a support member 62 extending outwardly and longitudinally from the support arm 60 and a mounting bracket 64 attached to the support member 62 by suitable means such as welding. The mounting bracket 64 is generally circular in shape. The mounting bracket 64 has a plurality of fasteners 66 such as threaded bolts attached thereto by suitable means such as welding which are adapted to extend through corresponding apertures (not shown) in a rim (not shown) of a spare tire 68 illustrated in FIG. 1. It should be appreciated that a plurality of nuts (not shown) are threadedly attached to the fasteners 66 to retain the spare tire 68 on the mounting bracket 64 of the carrier arm 50. It should be also appreciated that the carrier arm 50 moves similar to a bi-fold door via the arm bracket 42, post 40, arm portions 52 and 54 and hinge 56.

The swing-away spare tire carrier 10 includes a track 70 extending laterally to guide the movement of the carrier arm 50. The track 70 has a generally C-shaped cross-section. The track 70 has a side wall 72 and a top wall 74 and a bottom wall 76 extending generally perpendicular to the side wall 72. The track 70 has an end wall 77 extending upwardly and generally perpendicular to the bottom wall 76 and an end wall 78 extending downwardly and generally perpendicular to the top wall 74 to form a channel 79 therein. The track 70 is made of a metal material such as steel. The track 70 is a monolithic structure being integral, unitary and one-piece.

The swing-away spare tire carrier 10 includes a pair of support plates 80 connected to the cross bar 20 and track 70 to support the track 70 above the cross bar 20 and generally parallel to the carrier arm 50. The support plates 80 are spaced laterally and have recesses 82 for the cross bar 20 and track 70. The support plates 80 are secured to the cross bar 20 and track 70 by suitable means such as welding.

The swing-away spare tire carrier 10 includes a roller 84 disposed in the channel 79 of the track 70 for movement therealong. The roller 84 is generally circular in shape and is rotatably connected to a shaft 86 extending axially therefrom. The swing-away spare tire carrier 10 also includes a roller bracket 88 connected to the shaft 86. The roller bracket 88 is generally U-shaped to form a channel 90 to receive the second arm portion 54 of the carrier arm 50. The roller bracket 88 is pivotally connected to the second arm portion 54 by suitable means such as a pin 92 extending through the roller bracket 88 and second arm portion 54. It should be appreciated that the second arm portion 54 may rotate or pivot relative to the roller bracket 88 via the pin 92.

The swing-away spare tire carrier 10 may include a latching mechanism, generally indicated at 94, to latch the second arm portion 54 to the first arm portion 52 of the carrier arm 50. The latching mechanism 94 includes a handle 96 having a shaft 98 extending laterally through an aperture 100 in an end of the second arm portion 54. The latching mechanism 94 may include a bushing 102 such as a grommet disposed in the aperture 100 and about the shaft 98. The latching mechanism 94 has a projection 104 extending laterally and being generally cylindrical in shape. The projection 104 has a generally circular cross-sectional shape with a diameter greater than a diameter of the shaft 98. The projection 104 also has a flange 106 extending radially outwardly for a function to be described. The latching mechanism 94 includes a recess 108 extending into an end of the first arm portion 52. The recess 108 is shaped complementary to an end of the projection 104 to receive the end of the projection 104. The latching mechanism 94 also includes a housing 110 disposed about the projection 104 and connected to an end of the second arm portion 54. The housing 110 is generally U-shaped in cross-section and has opposed flanges 112 extending outwardly and secured to the end of the second arm portion 54 by suitable means such as welding. The housing 110 has a cavity 114 therein and an aperture 116 extending through the housing 110 and communicating with the cavity 114 to allow the shaft 98 to extend therethrough. The latching mechanism 94 includes a spring 118 disposed in the cavity 114 of the housing 110 about the projection 104 between the flange 106 and the housing 110. The spring 118 is generally conical in shape and of a coil spring type to urge the end of the projection 104 into the recess 108. It should be appreciated that the handle 96 is grasped by an operator and pulled to move the projection 104 out of engagement with the recess 108.

Figure 4:
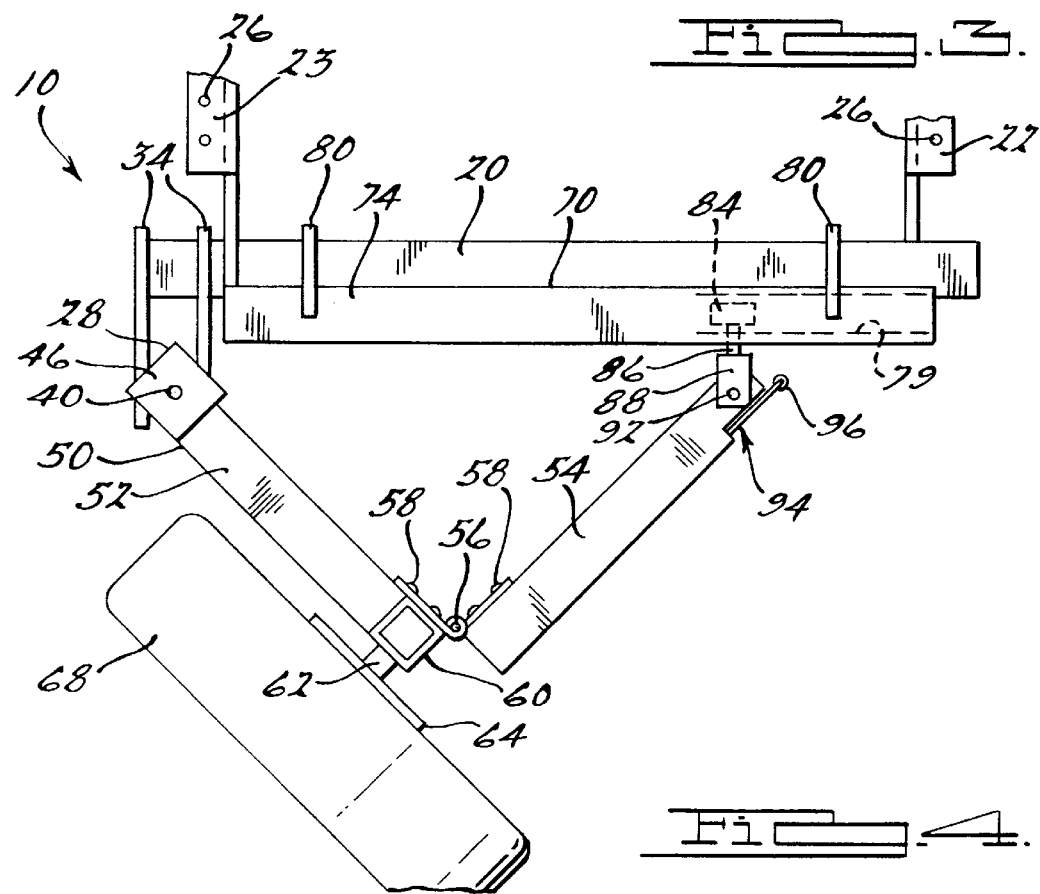
FIG. 4 is a view similar to FIG. 3 illustrating the swing-away spare tire carrier in a second position extending away from the vehicle body.

In operation, the spare tire 68 is removably mounted by a plurality of nuts (not shown) threadedly attached to the fasteners 66 to retain the spare tire 68 to the mounting bracket 66 on the carrier arm 50. The carrier arm 50 is secured from movement in a first position adjacent the vehicle body 14 as illustrated in FIG. 3. In this position, the projection 104 of the latching mechanism 94 is disposed in the recess 108 to latch or lock the first and second arm portions 52 and 54 together. The roller 84 is disposed in the channel 79 of the track 70 and prevents the carrier arm 50 from rotating about the post 40. To move the carrier arm 50, the latching mechanism 94 is unlatched by pulling on the handle 96 by an operator and moving the projection out of the recess 108. The second arm portion 54 is rotated relative to the first arm portion 52 via the hinge 56 and the first arm portion 52 is rotated relative to the arm bracket 28 via the post 40 to move the spare tire 68 away from the rear door 15 as illustrated in FIG. 4. The roller 84 moves along the channel 79 in the track 70 toward the post 40. As the roller 84 continues to move toward the post 40, the second arm portion 54 is rotated and moved relative to the first arm portion 52 to a second position extending laterally from the vehicle body 14 as illustrated in FIG. 5. As a result, the swing-away spare tire carrier 10 moves similar to a bi-fold door to allow opening of the rear door 15 of the motor vehicle 12 or removal of the spare tire 68. It should be appreciated that the operation is reversed for moving the spare tire 68 to the first position and latching the first arm portion 52 and second arm portion 54 together.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A swing-away spare tire carrier for a motor vehicle comprising:
   a cross tube extending transversely for attachment to underside vehicle structure of a motor vehicle;
   an arm support bracket secured to said cross tube; and
   a carrier arm having a first arm portion pivotally attached to said arm support bracket and a second arm portion pivotally attached to said first arm portion for pivotal movement between a first position adjacent a vehicle body of the motor vehicle and a second position extending substantially laterally from the vehicle body when said second arm portion is moved toward said first arm portion.

2. A swing-away spare tire carrier as set forth in claim 1 wherein said arm support bracket includes a post disposed therein, said first arm portion being disposed about said post.

3. A swing-away spare tire carrier as set forth in claim 1 including a hinge to pivotally connect said first arm portion and said second arm portion together.

4. A swing-away spare tire carrier as set forth in claim 1 wherein said carrier arm includes a support arm extending generally perpendicular to said first arm portion and a mounting bracket attached to said support arm for removably attaching a spare tire thereto.

5. A swing-away spare tire carrier as set forth in claim 1 including a track extending generally parallel to said cross tube and operatively connected thereto.

6. A swing-away spare tire carrier as set forth in claim 5 including a roller extending from said second arm portion and disposed in said track for translation therealong.

7. A swing-away spare tire carrier as set forth in claim 6 including a bracket connected to said roller and pivotally connected to said second arm portion.

8. A swing-away spare tire carrier as set forth in claim 1 including a latching mechanism to latch said first arm portion and second arm portion together when said carrier arm is in said first position.

9. A swing-away spare tire carrier as set forth in claim 8 wherein said latching mechanism comprises handle having a shaft extending through an end of said second arm portion and a projection on one end of said shaft.

10. A swing-away spare tire carrier as set forth in claim 9 wherein said latching mechanism includes a recess in an end of said first arm portion to receive an end of said projection.

11. A swing-away spare tire carrier as set forth in claim 10 wherein said latching mechanism includes a spring for urging said projection in said recess.

12. A swing-away spare tire carrier for a motor vehicle comprising:
    a cross tube extending transversely for attachment to underside vehicle structure of a motor vehicle;
    an arm support bracket secured to said cross tube;
    a carrier arm having a first arm portion pivotally attached to said arm support bracket and a second arm portion pivotally attached to said first arm portion;
    a track extending generally parallel to said cross tube and operatively connected thereto; and
    a roller extending from said second arm portion and disposed in said track for translation therealong, wherein said carrier arm has a first position adjacent a vehicle body of the motor vehicle and a second position extending substantially laterally from the vehicle body when said second arm portion is moved toward said first arm portion.

13. A swing-away spare tire carrier as set forth in claim 12 including a latching mechanism to latch said first arm portion and second arm portion together when said carrier arm is in said first position.

14. A swing-away spare tire carrier as set forth in claim 12 including a hinge to pivotally connect said first arm portion and said second arm portion together.

15. A swing-away spare tire carrier as set forth in claim 14 wherein said carrier arm includes a support arm extending generally perpendicular to said first arm portion and a mounting bracket attached to said support arm for removably attaching a spare tire thereto.

16. A swing-away spare tire carrier as set forth in claim 12 wherein said arm support bracket includes a post disposed therein, said first arm portion being disposed about said post.

17. A swing-away spare tire carrier as set forth in claim 16 wherein said latching mechanism comprises a handle having a shaft extending through an end of said second arm portion and a projection on one end of said shaft.

18. A swing-away spare tire carrier as set forth in claim 17 wherein said latching mechanism includes a recess in an end of said first arm portion to receive an end of said projection.

19. A swing-away spare tire carrier as set forth in claim 18 wherein said latching mechanism includes a spring for urging said projection in said recess.

20. A swing-away spare tire carrier for a motor vehicle comprising:
    a cross tube extending transversely for attachment to underside vehicle structure of a motor vehicle;
    an arm support bracket secured to said cross tube;
    a carrier arm having a first arm portion pivotally attached to said arm support bracket and a second arm portion pivotally attached to said first arm portion;
    a track extending generally parallel to said cross tube and operatively connected thereto;
    a roller extending from said second arm portion and disposed in said track for translation therealong; and
    a latching mechanism comprising a handle having a shaft extending through an end of said second arm portion and a projection on one end of said shaft and a recess in an end of said first arm portion to receive an end of said projection to latch said first arm portion and second arm portion together when said carrier arm is in a first position adjacent a vehicle body of the motor vehicle and to unlatch said first arm portion and said second arm portion to move said carrier arm to a second position extending substantially laterally from the vehicle body when said second arm portion is moved toward said first arm portion.

* * * * *